US007076977B2

(12) United States Patent
Lee

(10) Patent No.: US 7,076,977 B2
(45) Date of Patent: Jul. 18, 2006

(54) LOCK ASSEMBLY

(75) Inventor: Miko Lee, Hsin Chuang (TW)

(73) Assignee: Grace Lin (TW)

( * ) Notice: Subject to any disclaimer, the term of this patent is extended or adjusted under 35 U.S.C. 154(b) by 0 days.

(21) Appl. No.: 11/006,399

(22) Filed: Dec. 7, 2004

(65) Prior Publication Data

US 2006/0117816 A1 Jun. 8, 2006

(51) Int. Cl.
*E05B 73/00* (2006.01)
*F16B 41/00* (2006.01)

(52) U.S. Cl. ............................. 70/58; 70/230; 70/231; 70/232; 411/910

(58) Field of Classification Search .......... 70/229–232, 70/14, 18, 49, 58, DIG. 57, 223, 422, 188, 70/189, 149, 472; 411/910; 292/DIG. 27
See application file for complete search history.

(56) References Cited

U.S. PATENT DOCUMENTS 1,870,427 A * 8/1932 Stallings et al. .............. 70/231
1,961,106 A * 5/1934 Hurd ........................... 70/231
4,035,921 A * 7/1977 Williams ..................... 33/728
4,336,698 A * 6/1982 Hurd ........................... 70/231
4,620,428 A * 11/1986 Kopesky ...................... 70/175
5,284,038 A * 2/1994 Johnson ....................... 70/232
5,839,303 A * 11/1998 Umberg et al. ................ 70/58
6,199,413 B1 * 3/2001 McDaid et al. ................ 70/58
6,244,080 B1 * 6/2001 Sakurai ......................... 70/14
6,536,244 B1 * 3/2003 Chang ........................... 70/58
6,779,370 B1 * 8/2004 Bellow et al. ................. 70/14
2003/0101778 A1 * 6/2003 Carl et al. ..................... 70/58
2003/0106349 A1 * 6/2003 Broadbridge et al. .......... 70/58

* cited by examiner

*Primary Examiner*—Lloyd A. Gall
(74) *Attorney, Agent, or Firm*—Jackson Walker, LLP

(57) ABSTRACT

The lock assembly has a lock housing assembly, a driven assembly and a lock core. The driven assembly and the lock core are mounted in the lock housing assembly. The driven assembly has a connector and is selectively engaged to the lock core to allow the connector to be rotated to lock or unlock an object. The connector is able to lock two objects together or can connect an object to a stationary fixture with an optional cable, and the connector can be changed so a lock manufacturer can use this lock assembly to make many different kinds of locks.

16 Claims, 10 Drawing Sheets

LOCK ASSEMBLY

BACKGROUND OF THE INVENTION

1. Field of the Invention

The present invention relates to a lock assembly, and more particularly to a lock assembly that can be used to implement many different locking methods for many different kind of locks.

2. Description of Related Art

Conventional locks are used to protect property and secure people's safety. Most locks are designed for a specific application such as a door lock, a computer lock or a car lock. One lock means one design. No single lock design is available for multiple applications. Therefore, no lock assembly exists that has been designed for all applications. Many lock manufacturers spend much money to fabricate many difficult kinds of locks.

To overcome the shortcomings, the present invention provides a lock assembly to mitigate the aforementioned problems.

SUMMARY OF THE INVENTION

The primary objective of the present invention is to provide an improved lock assembly that allows a lock manufacturer to make many different kinds of the locks.

The lock assembly comprises a lock housing assembly, a driven assembly and a lock core. The lock housing assembly comprises a tubular housing and a shell rotatably mounted in the tubular housing. The driven assembly and the lock core are mounted in the shell. The lock core selectively engages and is rotated by the shell. The driven assembly has a connector that is selectively engaged to the lock core to allow the connector to be rotated to lock or unlock an object. The connector is able to lock two objects together or can connect an object to a stationary fixture with an optional cable, and the connector can be changed so a lock manufacturer can use this lock assembly to make many different kinds of locks.

Other objectives, advantages and novel features of the invention will become more apparent from the following detailed description when taken in conjunction with the accompanying drawings.

DETAILED DESCRIPTION OF THE PREFERRED EMBODIMENT

The lock assembly in accordance with the present invention includes a lock housing assembly, a driven assembly and a lock core. The lock housing assembly comprises a tubular housing and a shell rotatably mounted in the tubular housing. The lock core is mounted in the shell and selectively engages and is rotated by the shell. The driven assembly is mounted rotatably in the shell and has a connector that is selectively engaged to the lock core to allow the connector to be rotated to lock or unlock an object. The connector is able to lock two objects together or can connect an object to a stationary fixture with an optional cable, and the connector can be changed so a lock manufacturer can use this lock assembly to make many different kinds of locks.

Figure 1:
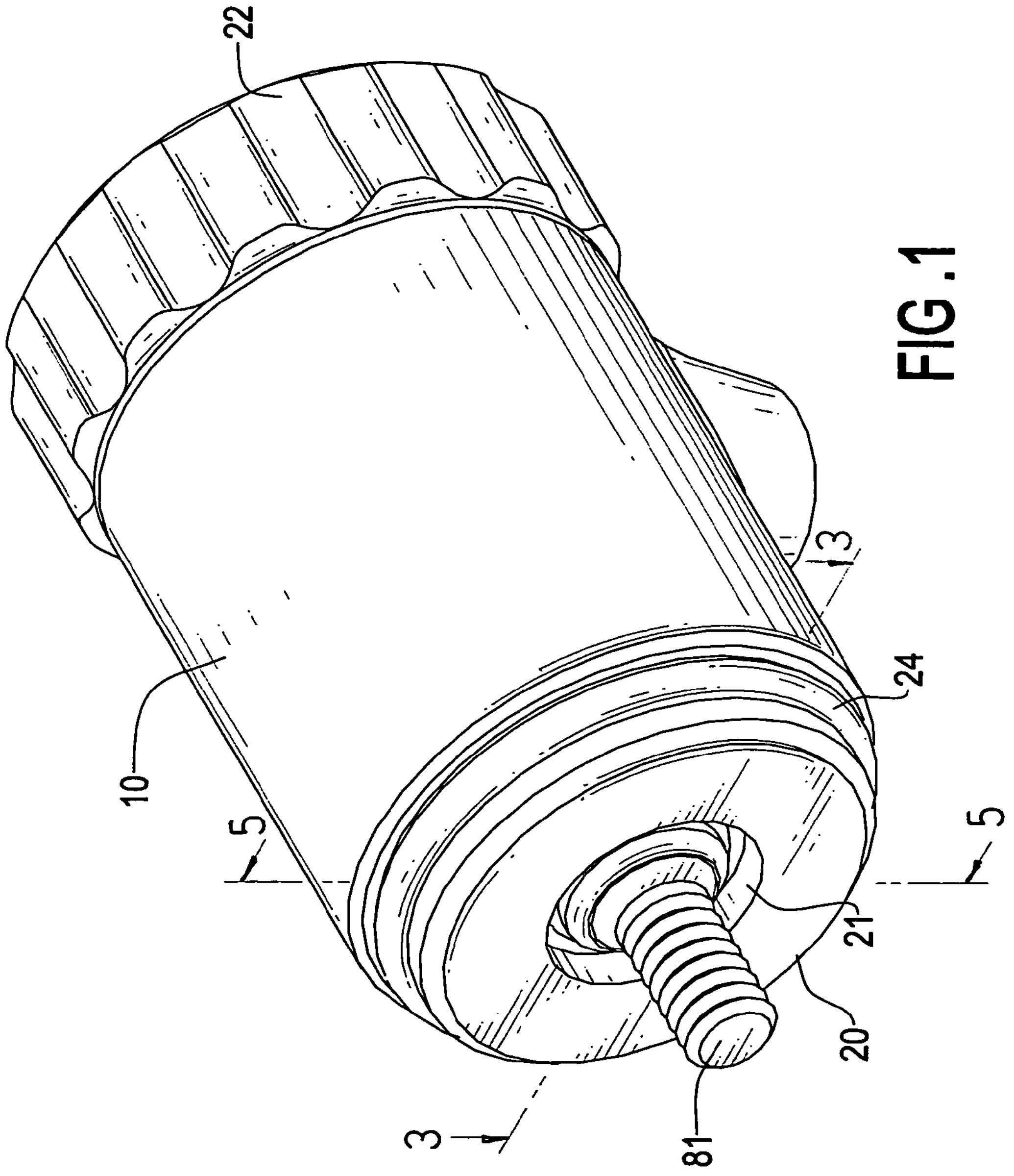
FIG. 1 is perspective view of a lock assembly in accordance with the present invention.
Figure 2:
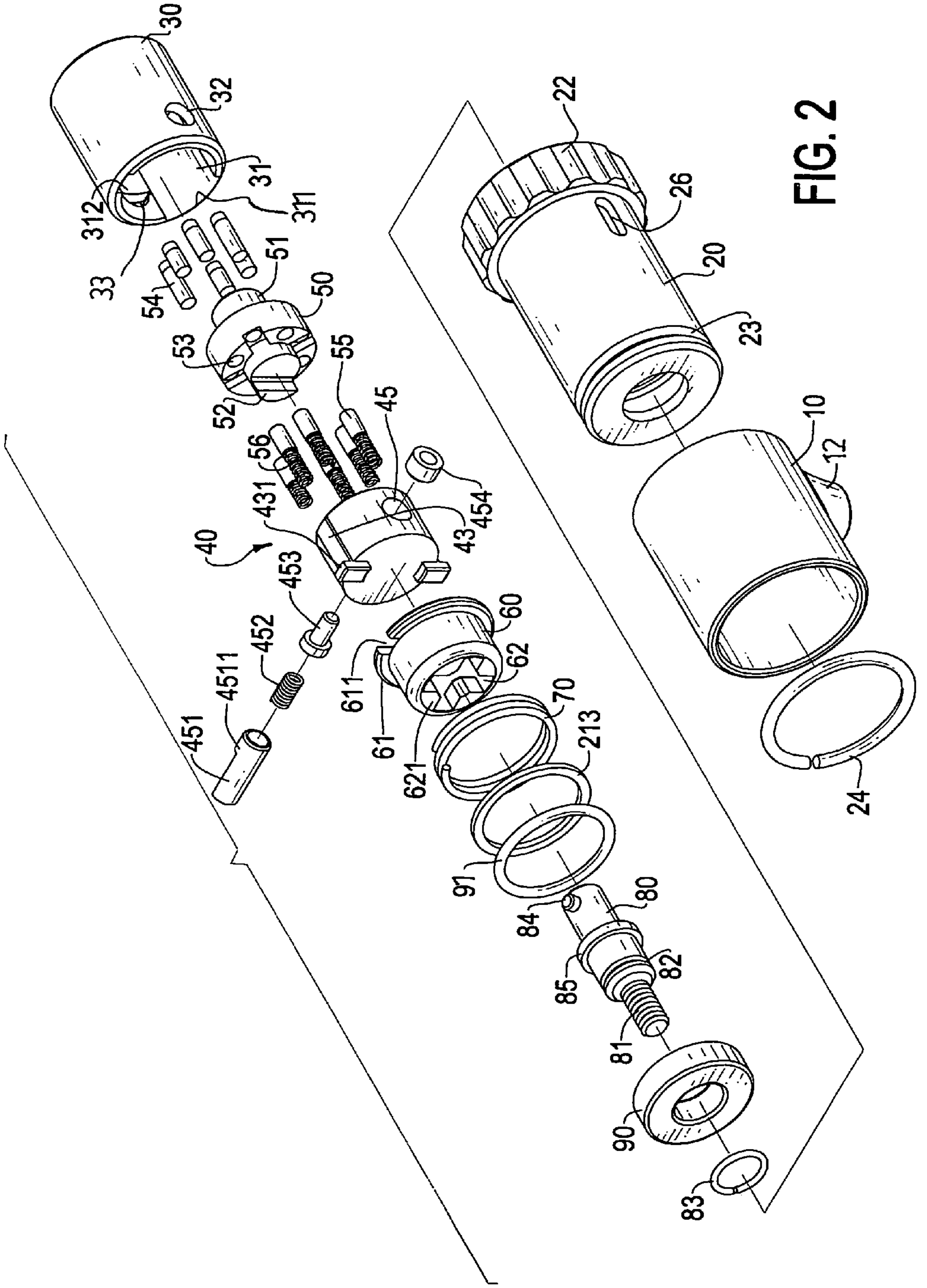
FIG. 2 is an exploded perspective view of the lock assembly in FIG. 1.

With reference to FIGS. 1 and 2, the lock housing assembly of a preferred embodiment of the lock assembly in accordance with the present invention has a housing (10) and a shell (20).

The housing (10) is tubular and has an outer surface, a rear end, a front end, a rear opening, a front opening and an optional cable connector (12). The rear opening is formed at the rear end of the housing (10). The front opening is formed at the front end of the housing (10). The cable connector (12) is formed on the outer surface of the housing (10) and securely holds one end of a cable (14) adapted to connect to the lock assembly. The cable (14) may be attached to or around an external fixture to lock an object to which the lock assembly is attached.

Figure 3:
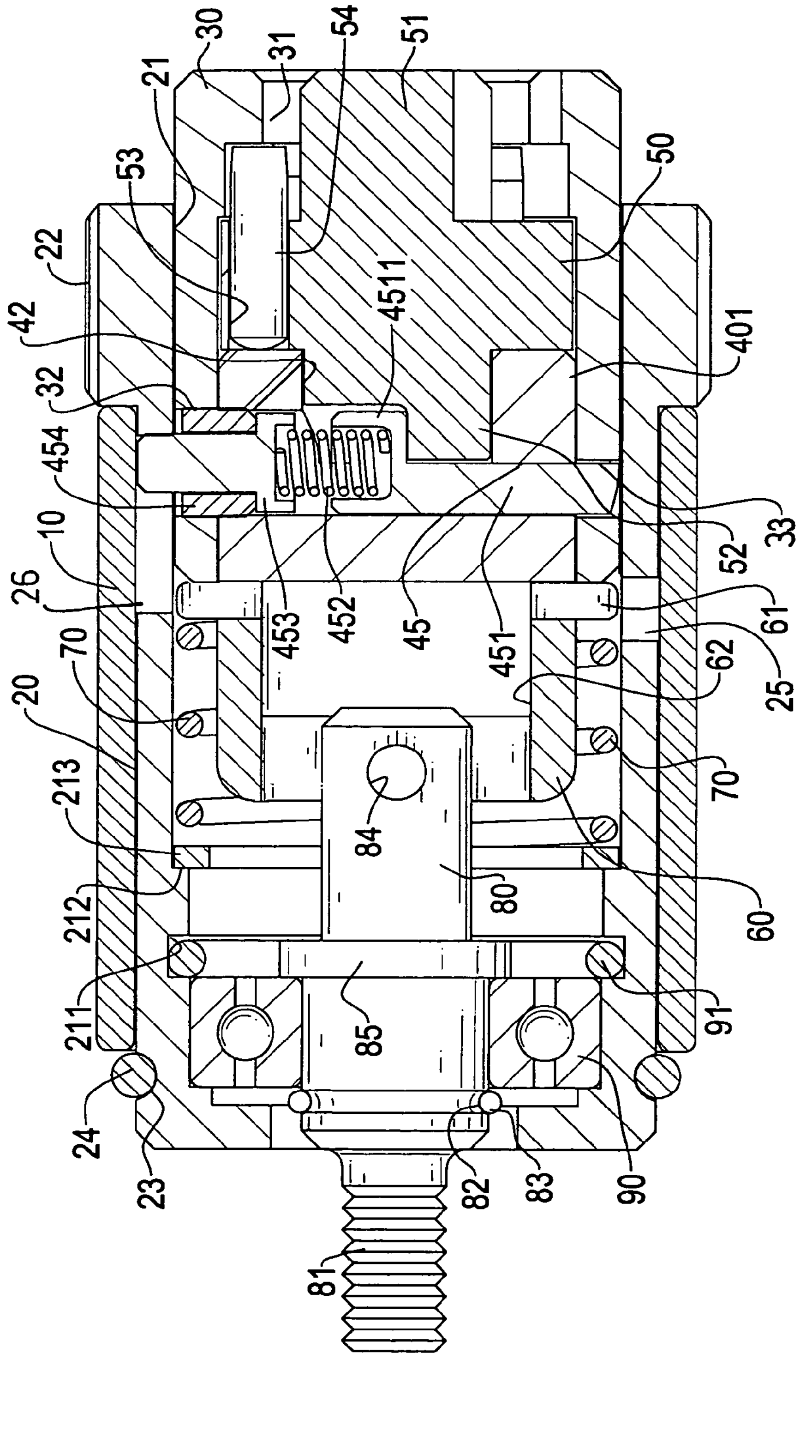
FIG. 3 is a bottom view in partial section of the lock assembly along line 3—3 in FIG. 1.

With further reference to FIG. 3, the shell (20) is tubular, is mounted rotatably in and extends through the housing (10) and has a rear end, a front end, an outer surface, a through hole (21), a fluted grip (22), an external annular groove (23), a split-ring (24), a position hole (25) and an elongated hole (26). The shell (20) is mounted rotatably in the housing (10), and the rear end and the front end protrude respectively from the rear opening and the front opening of the housing (10).

The through hole (21) is formed longitudinally through the shell (20) and has an inner surface, a lip, an internal annular groove (211), an internal shoulder (212) and a washer (213). The lip is formed at and protrudes radially in from the front end of the shell (20). The internal annular groove (211) is formed in the inner surface of the through hole (21) near the lip. The internal shoulder (212) is formed in the inner surface of the through hole (21) near the internal annular groove (211) toward the rear end of the shell (20). The washer (213) is mounted on the internal shoulder (212).

The fluted grip (22) is formed at the rear end of the shell (20), protrudes radially out from the outer surface of the shell (20) and abuts the rear end of the housing (10).

The external annular groove (23) is formed on the outer surface of the shell (20) near the front end of the shell (20).

The split-ring (24) is mounted in the external annular groove (23) after the shell (20) is slidably and rotatably mounted in the housing (10) to keep the shell (20) from sliding out of the housing (10).

The position hole (25) is formed radially through the shell (20) and communicates with the through hole (21).

The elongated hole (26) has a front end and a rear end, is formed longitudinally through the outer surface of the shell (20) and communicates with the through hole (21). The front end is diametrically opposite to the position hole (25).

The driven assembly is mounted in and protrudes from the front end of the shell (20) and has a bearing (90), an O-ring (91), a bolt (80), a seat (60) and a spring (70).

The bearing (90) is mounted in the through hole (21) in the shell (20) between the lip at the front end of the shell (20) and the internal annular groove (211).

The O-ring (91) is mounted in the internal annular groove (211) to hold the bearing (91) in place inside the shell (20).

The bolt (80) is mounted inside the bearing (90), protrudes from the front end of the shell (20) and has a rear end, a front end, a connector (81), an annular shoulder (85), an annular groove (82), an O-ring (83) and two drive rods (84).

Figure 9:
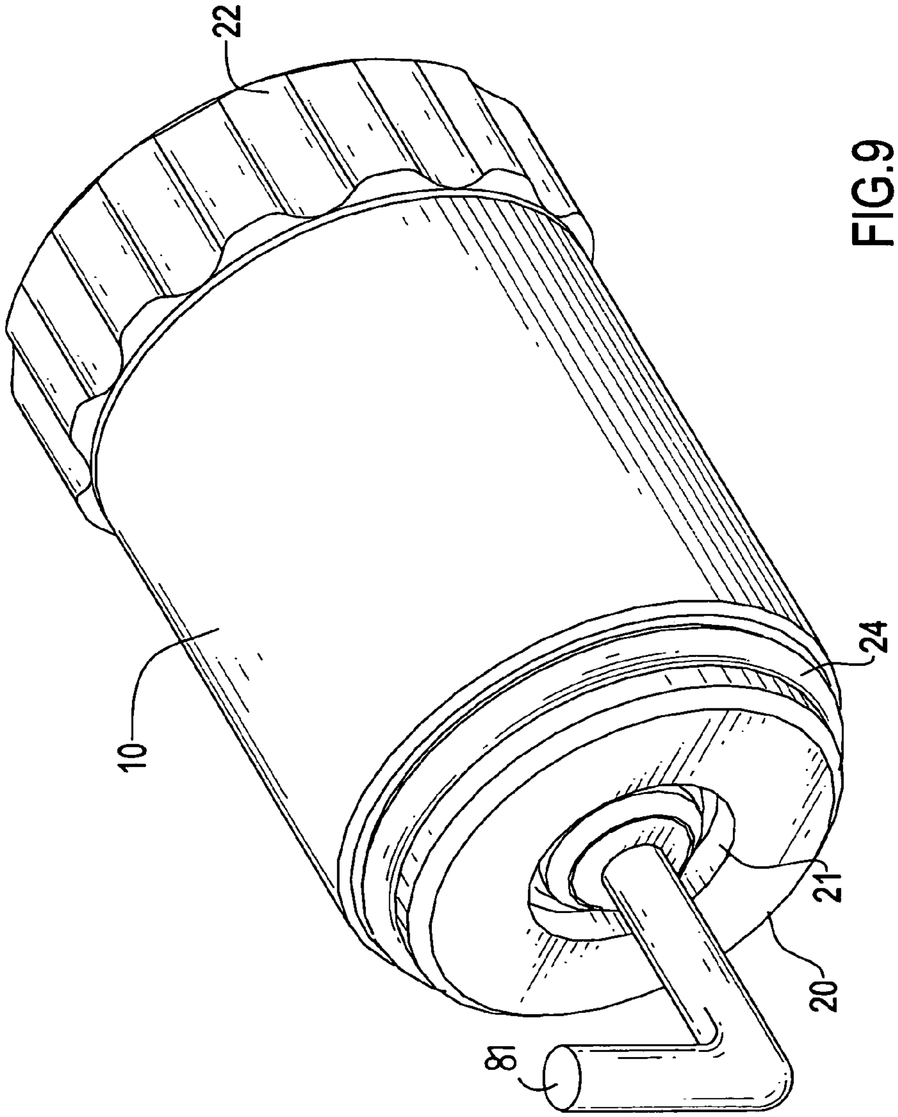
FIG. 9 is a perspective view of a second embodiment of the lock assembly in accordance with the present invention.
Figure 10:
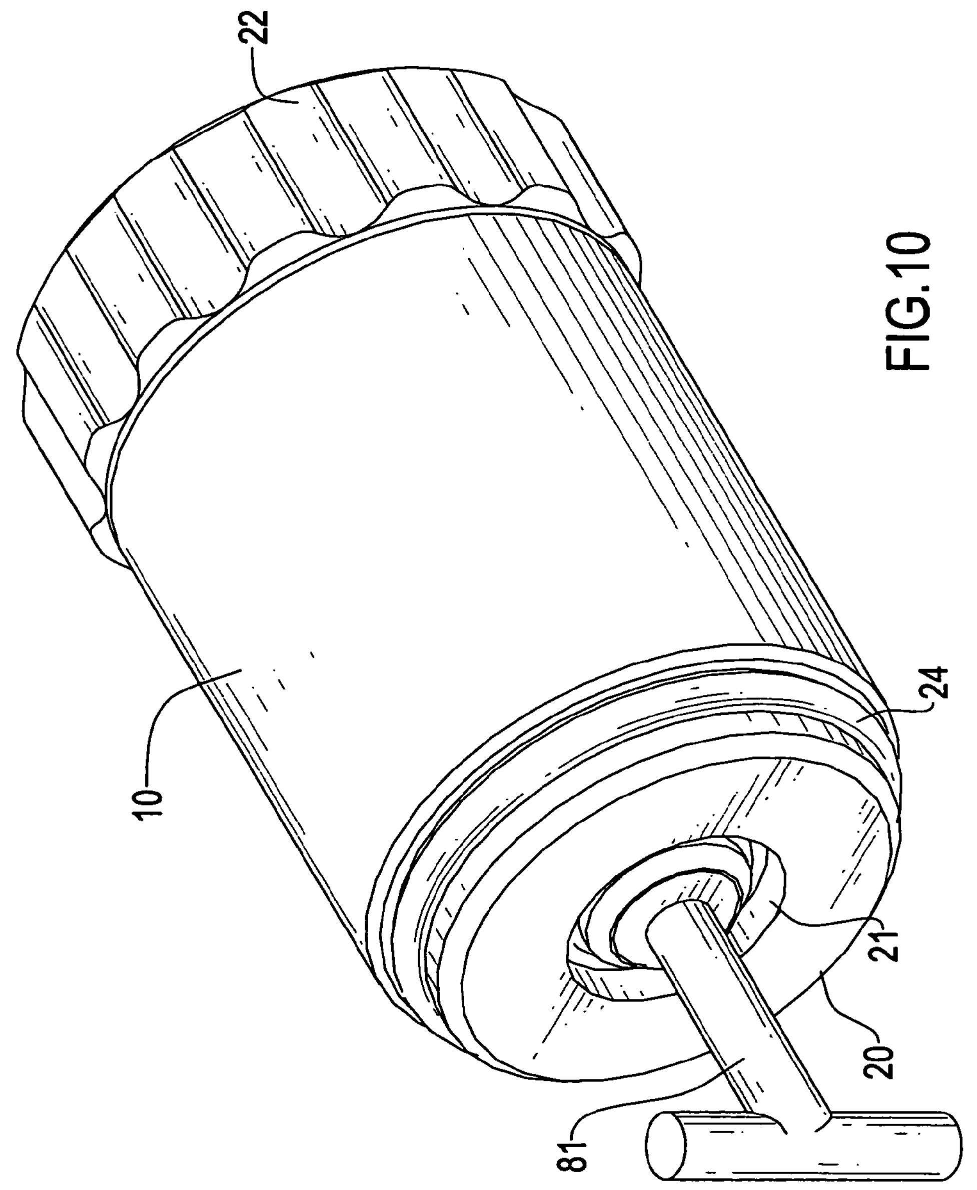
FIG. 10 is a perspective view of a third embodiment of the lock assembly in accordance with the present invention.

The connector (81) is formed at the front end of the bolt (80). A first embodiment of the connector (81) in accordance with the present invention is a threaded bolt. With further reference to FIG. 9, a second embodiment of the connector (81) in accordance with the present invention is an L-shaped rod. With further reference to FIG. 10, a third embodiment of the connector (81) in accordance with the present invention is a T-shaped rod.

The annular shoulder (85) is medially formed on the bolt (20) and abuts the bearing (90).

The annular groove (82) is formed around the bolt (80) near the connector (81).

The O-ring (83) is mounted in the annular groove (82) to hold the bolt (80) inside the bearing (90).

Figure 4:
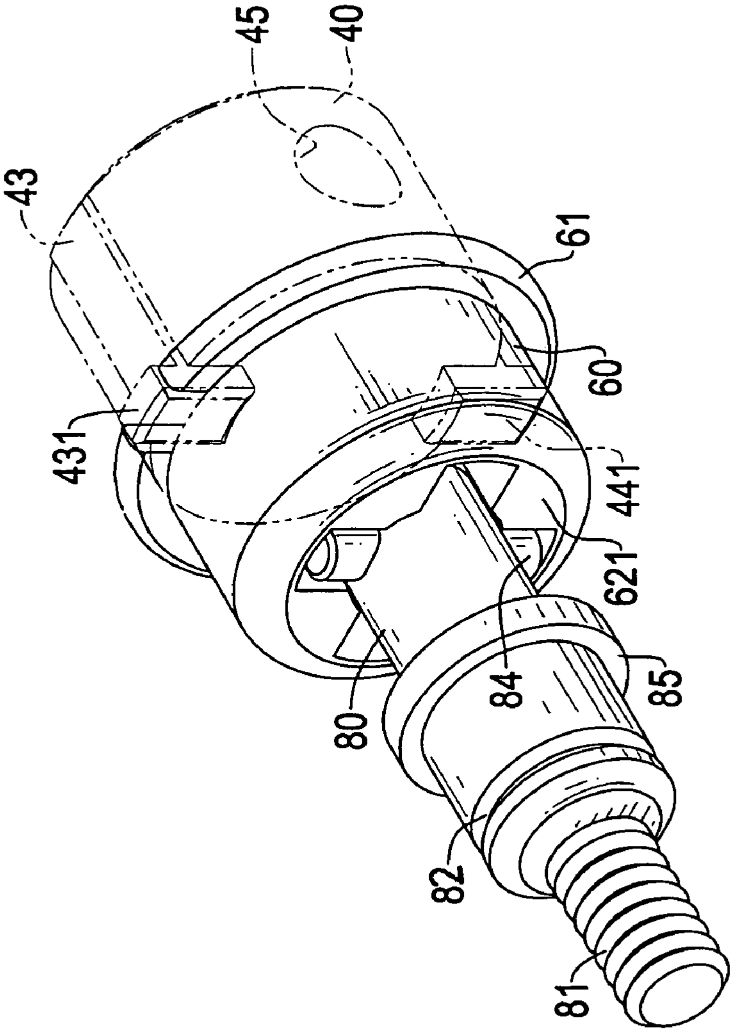
FIG. 4 is a perspective view of a bolt and a seat of the lock assembly in FIG. 2.

With further reference to FIG. 4, the drive rods (84) are formed at and protrude radially out from the rear end of the bolt (80) opposite to each other.

The seat (60) is tubular, selectively engages and rotates the bolt (80) and has a rear end, a front end, an outer surface, a through hole (62) and an outer lip (61).

The through hole (62) is formed longitudinally through the seat (60) and has a space, an inner surface and multiple radial segments (621). The space is formed inside the through hole (62) near the rear end of the seat (60). The radial segments (621) are formed on the inner surface of the through hole (62) near the front end of the seat (60) and form radial drive slots between the radial segments (621). The drive slots between the radial segments (621) selectively hold the drive rods (84) on the bolt (80) and communicate with the space of the seat (60). When the drive slots hold the drive rods (84), the bolt (80) can be turned by turning the seat (60), and the lock assembly is unlocked. When the drive slots are removed from the drive rods (84), the drive rods (84) move into the space of the seat (60) so that turning the seat (60) has no effect on the bolt (80), and the lock assembly is locked.

The outer lip (61) is formed on and protrudes out from the outer surface at the rear end of the seat (60) and has two cutouts (611). The cutouts (611) are formed opposite to each other through the outer lip (61).

The spring (70) is mounted around the seat (60) between the outer lip (61) on the seat (60) and the washer (213) in the shell (20) and presses the seat (60) away from the front end of the shell (20).

The lock core selectively engages the shell (20) and the seat (60), is mounted inside the rear end of the shell (20) and has a sleeve (30), an inner core (40), an outer core (50) and multiple spring-loaded pins. When the lock core engages the shell (20) and the seat (60), turning the fluted grip (22) on the shell (20) will turn the bolt (80), and the lock assembly is unlocked.

The sleeve (30) is tubular, is mounted in the through hole (21) in the shell (20), selectively protrudes from the rear end of the shell (20) and has a rear end, a front end, an outer surface, a longitudinal through hole (31), a hole (32) and a position hole (33). The longitudinal through hole (31) is formed longitudinally through the sleeve (30) and has an inner surface, an elongated slot (311) and a keyway (312). The elongated slot (311) and the keyway (312) are formed on the inner surface of the longitudinal through hole (31) in the sleeve (30) opposite to each other, communicate with the front end and extend toward the rear end. The hole (32) and the position hole (33) are formed through the outer surface of the sleeve (30) opposite to each other and communicate with the longitudinal through hole (31).

Figure 5:
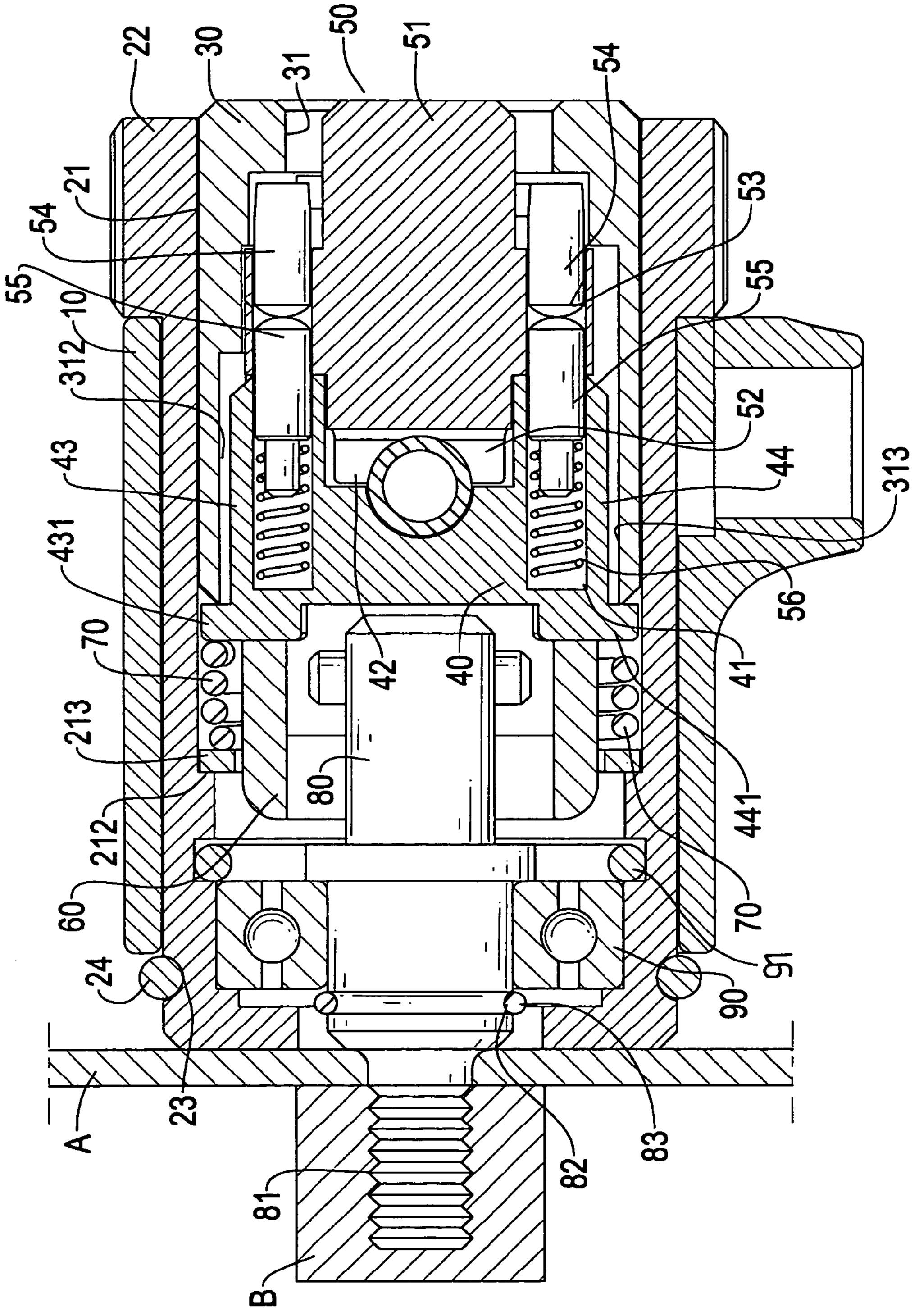
FIG. 5 is a side view in partial section of the lock assembly along line 5–5 in FIG. 1 locking an object to another object.
Figure 6:
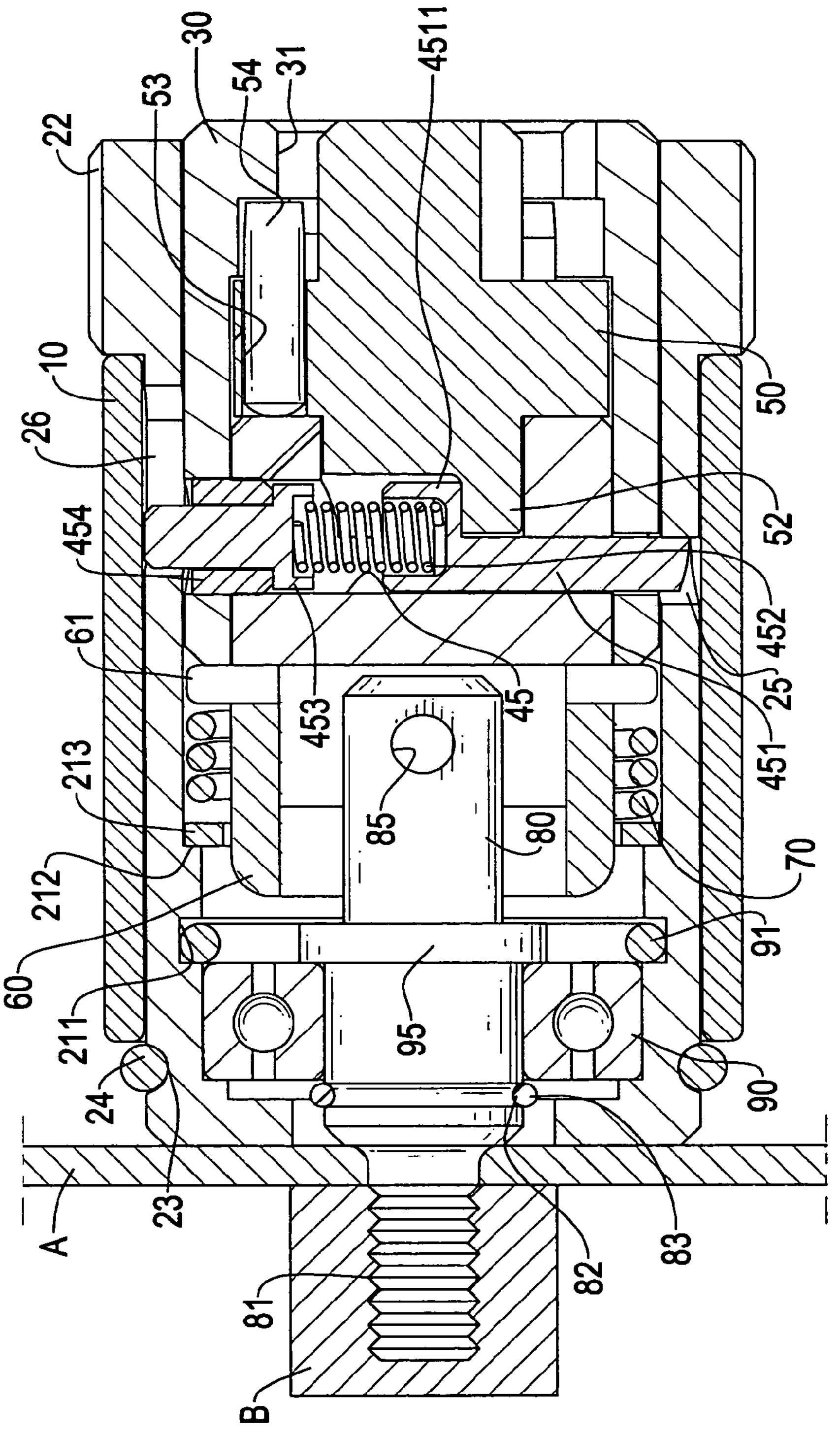
FIG. 6 is a bottom view in partial section of the lock assembly in FIG. 5.
Figure 7:
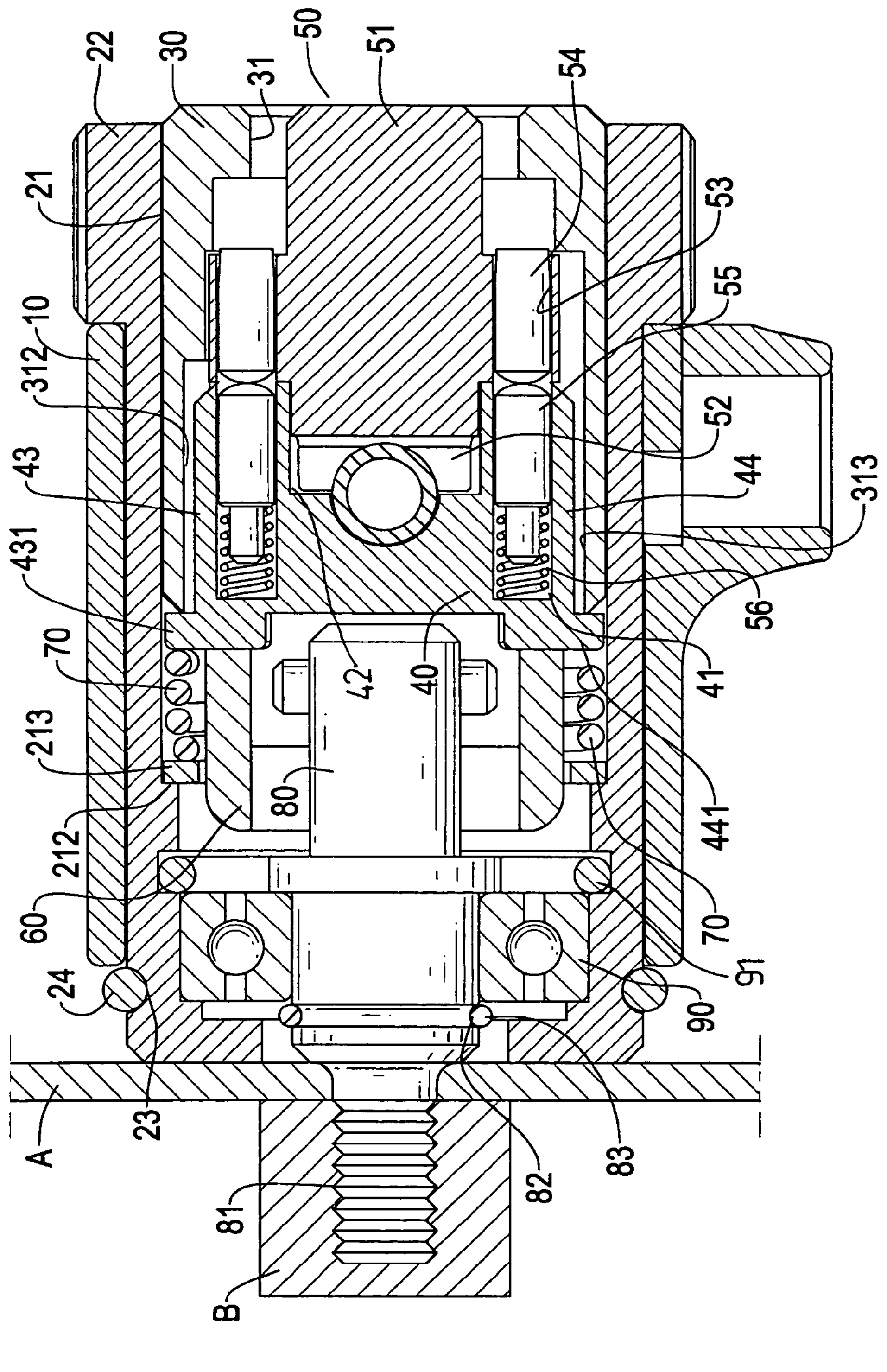
FIG. 7 is an operational side view in partial section of the lock assembly in FIG. 5 before moving the lock assembly to an unlocked position.
Figure 8:
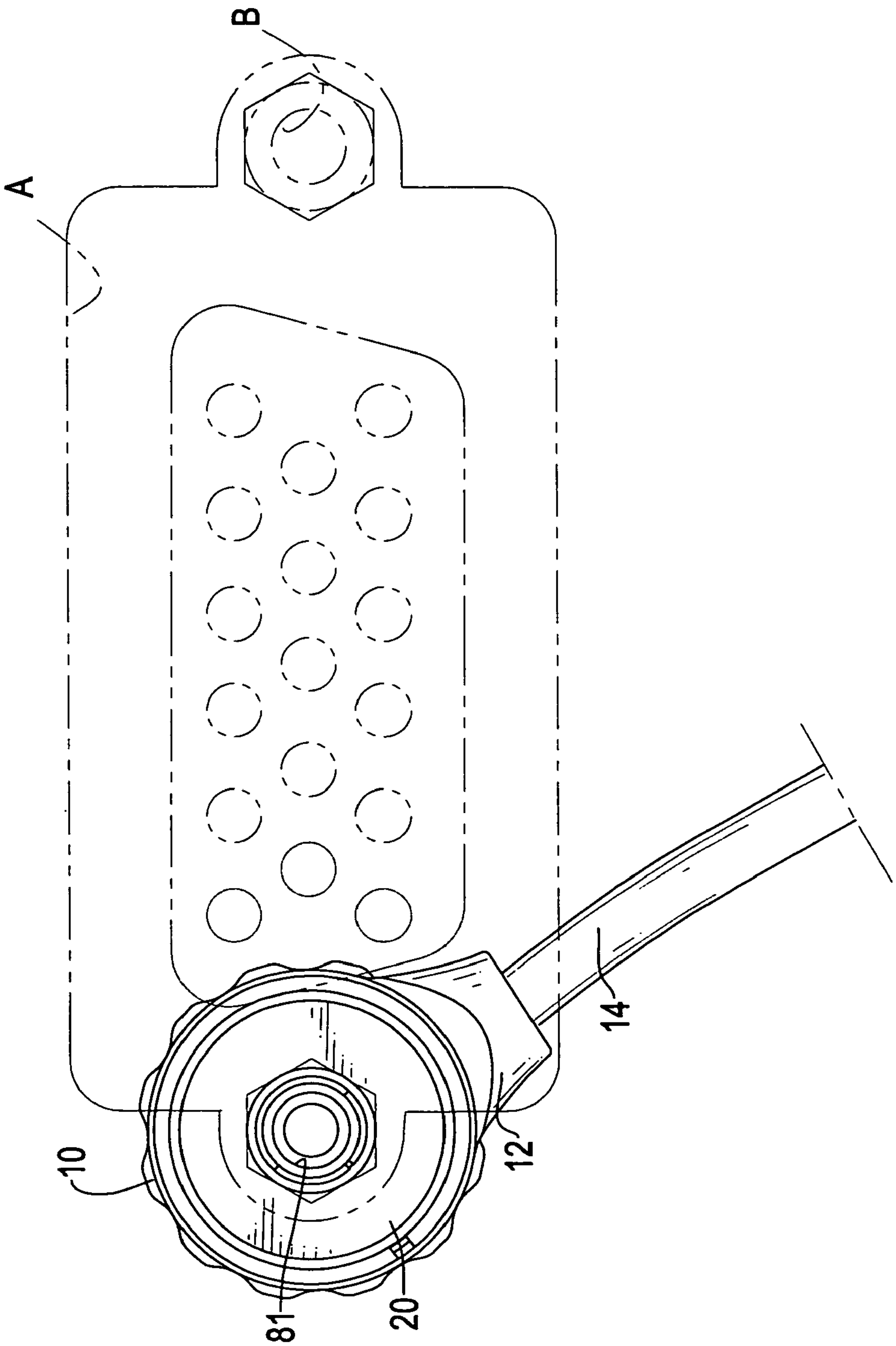
FIG. 8 is a rear view of the lock assembly in FIG. 1 attaching a locking cable to a computer port.

With further reference to FIG. 5, the inner core (40) is mounted in the longitudinal through hole (31) in the sleeve (30) at the front end of the sleeve (30), engages the seat (60), selectively engages the sleeve (30) and has a cylinder and a latch.

The cylinder has a rear end, a front end, an axial recess (42), multiple pin-spring holes (41), a sidewall, a transverse through hole (45) and two longitudinal keys (43). The axial recess (42) is formed in the rear end of the cylinder and has a bottom. The pin-spring holes (41) are formed longitudinally in the rear end of the cylinder around the axial recess (42). The transverse through hole (45) is formed radially through the cylinder and the bottom of the axial recess (42) and communicates with the axial recess (42). The longitudinal keys (43) are formed on diametrically opposite sides of the sidewall and individually have a front end and a tongue (431). The tongues (431) extend radially out respectively from the front ends of the longitudinal keys (43) and engage the cutouts (611) in the outer lip (61) of the seat (60).

The latch has a latch pin (451), a bushing (454), a guide pin (453) and a spring (452). The latch pin (451) is mounted in and selectively protrudes from the transverse through hole (45) in the cylinder of the inner core (40) and the position hole (33) in the sleeve (30) into the hole (25) in the shell (20) and has a shoulder (4511). The shoulder (4511) is formed on the latch pin (451) and is mounted in the axial recess (42) of cylinder. The bushing (454) is mounted securely in the transverse through hole (45) in the cylinder of the inner core (45), flush with the sidewall of the cylinder and aligned with the hole (32) in the sleeve (30) and the elongated hole (26) in the shell (20). The guide pin (453) is mounted in the transverse through hole (45) and the bushing (454) in the cylinder, protrudes from the bushing (454), extends through the hole (32) in the sleeve (30) and into the elongated hole (26) in the shell (20) and has an enlarged head. The head abuts the bushing (454). The spring (452) is mounted in the transverse through hole (45) between the latch pin (451) and the enlarged head of the guide pin (453).

The outer core (50) is mounted rotatably inside the sleeve (30) near the rear end of the sleeve (30) and has a rear end, a front end, a sidewall, a positive stop, a rear extension (51), a front extension (52), multiple pin holes (53) and multiple push pins (54). The positive stop is formed on and protrudes from the sidewall of the outer core (50) and is mounted rotatably in the elongated slot (311) inside the sleeve (30) to limit the rotation of the outer core (50) relative to the inner core (40). The rear extension (51) is formed coaxially on the rear end of the outer core (50) and extends through the sleeve (30) and rear end of the shell (20). The front extension (52) is formed coaxially on the front end of the outer core (50), extends into the axial recess (42) in the cylinder of the inner core (40) and engages the shoulder (4511) on the latch pin (451) to selectively push the latch pin (451) into the hole (25) in the shell (20). The pin holes (53) are formed longitudinally through the outer core (50) around the rear extension (51), selectively align with the pin-spring holes (41) in the cylinder of the inner core (40) and individually have a rear end and a front end. The push pins (54) are slidably mounted respectively in the pin holes (53) through the outer core (50) and protrude from the rear ends of the pin holes (53) to be selectively pushed into the outer core (50) by a key inserted into the rear end of the sleeve (30).

The spring-loaded pins are mounted respectively in the pin-spring holes (41) in the cylinder of the inner core (40) and individually have a pin (55) and a spring (56). The pins (55) slidably extend respectively into the pin holes (53) in the outer core (50) to lock the outer core (50) relative to the inner core (40). The spring (56) is received into the corresponding pin-spring hole (41) in the inner core (40) and pushes against the pin (53).

With further reference to FIGS. 5, 6, 7 and 8, a key is used to push all the push pins (54) that push all the spring-loaded pins out of the pin holes (53) in the outer core (50). The rear extension (51) is then pressed until the latch pin (451) aligns with the position hole (33) in the sleeve (30) and the hole (25) in the shell (20) and the radial drive slots between the radial segments (621) in the seat (60) hold the drive rods (84) on the bolt (80). The outer core (50) is rotated, and the front extension (52) releases the shoulder on the latch pin (451) that is driven into the hole (25) in the shell (20), which connects the bolt (80), the seat (60), the lock core, the sleeve (30) and the shell (20) together. Rotating the fluted grip (22) on the shell (20) rotates the bolt (80) and allows the connector (81) on the bolt (80) to be connected to or disconnected from an appropriate fitting, such as a port (B) on an object (A).

With reference to FIGS. 9 and 10, in such an arrangement, the connector (81) on the bolt (80) is able to be changed to a thread bolt, a T-shaped rod or an L-shaped rod to be connected or disconnected from the appropriate fitting. Therefore, the lock assembly is able to lock or unlock any subject or fit into any lock apparatus. It is convenient to any lock manufacturer or a person who uses the lock assembly in accordance with the present invention.

Even though numerous characteristics and advantages of the present invention have been set forth in the foregoing description together with details of the structure and function of the invention, the disclosure is illustrative only. Changes may be made in detail especially in matters of shape, size, and arrangement of parts within the principles of the invention to the full extent indicated by the broad general meaning of the terms in which the appended claims are expressed.

What is claimed is:

1. A lock assembly comprising:
- a lock housing assembly comprising a tubular housing and a shall rotatably mounted in the tubular housing;
- a lock core mounted in the shell and selectively engaging and rotated by the shell; and
- a driven assembly mounted rotatably in the shell and having a bolt selectively engaged with the lock core and having
  - a rear end;
  - a front end;
- a connector formed at the front end of the bolt so that the connector is able to be rotated to lock or unlock an object
- wherein the lock housing assembly has
  - a housing being tubular and having
    - a rear end;
    - a rear opening formed at the rear end of the housing;
    - a front end; and
    - a front opening formed at the front end of the housing;
  - a shell being tubular, mounted rotatably in and extending through the housing and having
    - a rear end extending out of the rear opening of the housing;
    - a front end extending out of the front opening of the housing;
    - an outer surface;
    - a through hole formed longitudinally through the shell;
    - a fluted grip formed at the rear end of the shell, protruding radially out from the outer surface of the shell and abutting the rear end of the housing;
    - an external annular groove formed on the outer surface of the shell near the front end of the shell;
    - a split-ring mounted in the external annular groove to keep the shell from sliding out of the housing.

2. The lock assembly as claimed in claim 1, wherein the through hole of the shell has
- an inner surface;
- a lip formed at and protruding radially in the front end of the shell;
- an internal annular groove formed in the inner surface of the through hole near the lip;
- an internal shoulder formed in the inner surface of the through hole near the internal annular groove toward the rear end of the shell; and
- a washer mounted on the internal shoulder;

the driven assembly further has
- a bearing mounted in the through hole in the shell between the lip at the front end of the shell and the internal annular groove;
- an O-ring mounted in the internal annular groove to hold the bearing in place inside the shell;
- a seat being tubular, selectively engaging and rotating the bolt and having
  - a rear end;
  - a front end;
  - an outer surface;
  - a through hole formed longitudinally through the seat and having
    - an inner surface; and
    - multiple radial segments formed on the inner surface of the through hole near the front end of the seat and forming radial drive slots between the radial segments, which selectively engage drive rods on the bolt; and
  - an outer lip formed on the outer surface at the rear end of the seat; and
- a spring mounted around the seat between the outer lip on the seat and the washer in the shell and pressing the seat away from the front end of the shell; and
- the bolt is mounted inside the bearing, protrudes from the front end of the shell and has
  - an annular shoulder medially formed on the bolt and abutting the bearing;
  - an annular groove formed around the bolt near the connector;
  - an O-ring mounted in the annular groove to hold the bolt inside the bearing; and the drive rods being two drive rods formed at and protruding radially out from the rear end of the bolt opposite to each other.

3. The lock assembly as claimed in claim 2, wherein the shell has a position hole formed radially through the shell and communicating with the through hole; and an elongated hole formed longitudinally through the outer surface of the shell, communicating with the through hole and having a rear end and a front end diametrically opposite to the position hole;

the outer lip of the seat has two cutouts formed opposite to each other through the outer lip; and the lock core selectively engages the shell and the seat, is mounted inside of the rear end of the shell and has a sleeve being tubular, mounted in the through hole in the shell, selectively protruding from the rear end of the shell and having a rear end;

a front end;

an outer surface;

a longitudinal through hole formed longitudinally through the sleeve and having an inner surface;

an elongated slot formed on the inner surface of the longitudinal through hole in the sleeve, communicating with the front end and extending toward the rear end; and a keyway formed on the inner surface of the longitudinal through hole of the sleeve opposite to the elongated slot of the longitudinal through hole in the sleeve, communicating with the front end and extending toward the rear end;

a hole formed through the outer surface of the sleeve and communicating with the longitudinal through hole; and a position hole formed through the outer surface of the sleeve opposite to the hole of the sleeve and communicating with the longitudinal through hole;

an inner core mounted in the longitudinal through hole of the sleeve at the front end of the sleeve, engaging the seat, selectively engaging the sleeve and having a cylinder having a rear end;

a front end;

an axial recess formed at the rear end of the cylinder and having a bottom;

multiple pin-spring holes formed longitudinally in the rear end of the cylinder around the axial recess;

a sidewall;

a transverse through hole formed radially through the cylinder and the bottom of the axial recess and communicating with the axial recess; and two longitudinal keys formed on diametrically opposite sides of the sidewall, and individually having a front end;

a tongue extending radially out from the front end of the longitudinal key and engaging the cutouts in the outer lip of the seat; and a latch having a latch pin mounted in and selectively protruding from the transverse through hole in the cylinder of the inner core and the position hole in the sleeve into the position hole in the shell and having a shoulder formed on the latch pin and mounted in the axial recess of the cylinder;

a bushing mounted securely in the transverse through hole in the cylinder, flush with the sidewall of the cylinder and aligned with the hole in the sleeve and the elongated hole in the shell;

a guide pin mounted in the transverse through hole and the bushing in the cylinder, protruding from the bushing, extending through the hole in the sleeve and into the elongated hole in the shell and having an enlarged head that abuts the bushing; and a spring mounted in the transverse through hole between the latch pin and the enlarged head of the guide pin of a position pin combination; and an outer core mounted rotatably inside the sleeve near the rear end of the sleeve and having a rear end;

a front end;

a sidewall;

a positive stop formed on and protruding from the sidewall of the outer core and mounted rotatably in the elongated slot inside the sleeve to limit the rotation of the outer core relative to the inner core;

a rear extension formed coaxially on the rear end of the outer core and extending through the sleeve and the rear end of the shell;

a front extension formed coaxially on the front end of the outer core, extending into the axial recess in the cylinder of the inner core and engaging the shoulder on the latch pin to selectively push the latch pin into the position hole in the shell;

multiple pin holes formed longitudinally through the outer core around the rear extension, selectively aligning with the pin-spring holes in the cylinder of the inner core and individually having a rear end; and a front end; and multiple push pins slidably mounted respectively in the pin holes through the outer core and protruding from the rear end of the pin holes to be selectively pushed into the outer core by a key inserted into the rear end of the sleeve; and multiple spring-loaded pins mounted respectively in the pin-spring holes and individually having a pin slidably extending respectively into one of the pin holes in the outer core to lock the outer core relative to the inner core; and a spring received into the pin-spring hole in which the pin is received and pushes against the pin.

4. The lock assembly as claimed in claim 3, wherein the connector of the bolt is a threaded bolt.

5. The lock assembly as claimed in claim 3, wherein the connector of the bolt is a T-shaped rod.

6. The lock assembly as claimed in claim 3, wherein the connector of the bolt is an L-shaped rod.

7. The lock assembly as claimed in claim 3, wherein the housing further comprises a cable connector formed on the outer surface of the housing to securely hold a cable adapted to connect to the lock assembly.

8. A lock assembly having a locking housing assembly composed of a housing and a shell rotatably mounted in the housing, a lock core received in the shell and selectively engaging and operably connected by the shell, wherein the improvement comprises:

a seat securely connected to the lock core and having a front end;

a rear end;

a through hole formed longitudinally through the seat and having a space formed inside the through hole near the rear end of the seat;

an inner surface; and drive slots defined near the front end of the seat and communicating with the space; and a bolt movably mounted in the through hole of the seat; wherein when the bolt is engaged with the drive slots of the seat, the rotation of the shell rotates the bolt, and when the bolt is disengaged from the drive slots, the bolt is free from influence of the rotation of the shell.

9. The lock assembly as claimed in claim 8, wherein the housing has a rear end;

a rear opening formed at the rear end of the housing;

a front end; and a front opening formed at the front end of the housing;

the shell is mounted rotatably in and extends through the housing and has a rear end extending out of the rear opening in the housing;

a front end extending out of the front opening in the housing;

an outer surface; and a through hole formed longitudinally through the shell;

the bolt protrudes from the front end of the shell and has a front end;

a rear end; and two drive rods formed at and protruding radially out from the rear end of the bolt opposite to each other;

the seat further has radial segments formed on the inner surface of the through hole near the front end of the seat and selectively engaging the drive rods on the bolt; and the drive slots are formed between the radial segments of the seat.

10. The lock assembly as claimed in claim 9, wherein the housing is tubular;

the shell is tubular and has a fluted grip formed at the rear end of the shell, protruding radially out from the outer surface of the shell and abutting the rear end of the housing;

an external annular groove formed on the outer surface of the shell near the front end of the shell; and a split-ring mounted in the external annular groove to keep the shell from sliding out of the housing.

11. The lock assembly as claimed in claim 10, wherein the through hole in the shell has a lip formed at and protruding radially in the front end of the shell;

an internal annular groove formed in the inner surface of the through hole near the lip;

an internal shoulder formed in the inner surface of the through hole near the internal annular groove toward the rear end of the shell; and a washer mounted on the internal shoulder;

the shell further has a bearing mounted in the through hole in the shell between the lip at the front end of the shell and the internal annular groove;

an O-ring mounted in the internal annular groove to hold the bearing in place inside the shell;

the seat being tubular, selectively engaging and rotating the bolt and having an outer lip formed on the outer surface at the rear end of the seat; and a spring mounted around the seat between the outer lip on the seat and the washer in the shell and pressing the seat away from the front end of the shell; and the bolt is mounted inside the bearing and has an annular shoulder medially formed on the bolt and abutting the bearing;

an annular groove formed around the bolt near a connector, and an O-ring mounted in the annular groove to hold the bolt inside the bearing.

12. The lock assembly as claimed in claim 11, wherein the shell has a position hole formed radially through the shell and communicating with the through hole; and an elongated hole formed longitudinally through the outer surface of the shell, communicating with the through hole and having a rear end and a front end diametrically opposite to the position hole;

the outer lip of the seat has two cutouts formed opposite to each other through the outer lip; and the lock core selectively engages the shell and the seat, is mounted inside of the rear end of the shell and has a sleeve being tubular, mounted in the through hole in the shell, selectively protruding from the rear end of the shell and having a rear end;

a front end;

an outer surface;

a longitudinal through hole formed longitudinally through the sleeve and having an inner surface;

an elongated slot formed on the inner surface of the longitudinal through hole in the sleeve, communicating with the front end and extending toward the rear end; and a keyway formed on the inner surface of the longitudinal through hole of the sleeve opposite to the elongated slot of the longitudinal through hole in the sleeve, communicating with the front end and extending toward the rear end;

a hole formed through the outer surface of the sleeve and communicating with the longitudinal through hole; and a position hole formed through the outer surface of the sleeve opposite to the hole of the sleeve and communicating with the longitudinal through hole;

an inner core mounted in the longitudinal through hole of the sleeve at the front end of the sleeve, engaging the seat, selectively engaging the sleeve and having a cylinder having a rear end;

a front end;

an axial recess formed at the rear end of the cylinder and having a bottom;

multiple pin-spring holes formed longitudinally in the rear end of the cylinder around the axial recess;

a sidewall;

a transverse through hole formed radially through the cylinder and the bottom of the axial recess and communicating with the axial recess; and two longitudinal keys formed on diametrically opposite sides of the sidewall, and individually having a front end; and a tongue extending radially out from the front end of the longitudinal key and engaging the cutouts in the outer lip of the seat; and a latch having a latch pin mounted in and selectively protruding from the transverse through hole in the cylinder of the inner core and the position hole in the sleeve into the position hole in the shell and having a shoulder formed on the latch pin and mounted in the axial recess of the cylinder;

a bushing mounted securely in the transverse through hole in the cylinder, flush with the sidewall of the cylinder and aligned with the hole in the sleeve and the elongated hole in the shell;

a guide pin mounted in the transverse through hole and the bushing in the cylinder, protruding from the bushing, extending through the hole in the sleeve and into the elongated hole in the shell and having an enlarged head that abuts the bushing; and a spring mounted in the transverse through hole between the latch pin and the enlarged head of the guide pin; and an outer core mounted rotatably inside the sleeve near the rear end of the sleeve and having a rear end;

a front end;

a sidewall;

a positive stop formed on and protruding from the sidewall of the outer core and mounted rotatably in the elongated slot inside the sleeve to limit the rotation of the outer core relative to the inner core;

a rear extension formed coaxially on the rear end of the outer core and extending through the sleeve and the rear end of the shell;

a front extension formed coaxially on the front end of the outer core, extending into the axial recess in the cylinder of the inner core and engaging the shoulder on the latch pin to selectively push the latch pin into the position hole in the shell;

multiple pin holes formed longitudinally through the outer core around the rear extension, selectively aligning with the pin-spring holes in the cylinder of the inner core and individually having a rear end; and a front end; and multiple push pins slidably mounted respectively in the pin holes through the outer core and protruding from the rear ends of the pin holes to be selectively pushed into the outer core by a key inserted into the rear end of the sleeve; and multiple spring-loaded pins mounted respectively in the pin-spring holes and individually having a pin slidably extending into one of the pin holes in the outer core to lock the outer core relative to the inner core; and a spring mounted in the pin-spring hole in which the pin is received and pushes against the pin.

13. The lock assembly as claimed in claim 12, wherein the connector of the bolt is a threaded bolt.

14. The lock assembly as claimed in claim 12, wherein the connector of the bolt is a T-shaped rod.

15. The lock assembly as claimed in claim 12, wherein the connector of the bolt is an L-shaped rod.

16. The lock assembly as claimed in claim 12, wherein the housing further comprises a cable connector formed on the outer surface of the housing to securely hold a cable adapted to connect to the lock assembly.

* * * * *